United States Patent
Prasad et al.

(10) Patent No.: US 9,940,188 B2
(45) Date of Patent: Apr. 10, 2018

(54) RESOLVING CONFLICTS BETWEEN MULTIPLE SOFTWARE AND HARDWARE PROCESSES

(71) Applicant: International Business Machines Corporation, Armonk, NY (US)

(72) Inventors: Ramya Hari Hara Prasad, Pune (IN); Girish Sundaram, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 14/963,604

(22) Filed: Dec. 9, 2015

(65) Prior Publication Data
US 2017/0168888 A1   Jun. 15, 2017

(51) Int. Cl.
G06F 11/00 (2006.01)
G06F 11/07 (2006.01)
G06F 9/48 (2006.01)

(52) U.S. Cl.
CPC ........ *G06F 11/0793* (2013.01); *G06F 9/4881* (2013.01); *G06F 11/0721* (2013.01)

(58) Field of Classification Search
CPC ............. G06F 11/0793; G06F 11/0721; G06F 11/0781; G06F 11/079; G06F 11/3003; G06F 11/3024; G06F 11/3051; G06F 11/3409; G06F 11/3466
USPC .......... 714/37, 25, 26, 30, 31, 33, 38.1, 47.1
See application file for complete search history.

(56) References Cited

U.S. PATENT DOCUMENTS

| | | | |
|---|---|---|---|
| 7,415,119 B2 | 8/2008 | Boss et al. | |
| 2006/0020570 A1* | 1/2006 | Wu | G06F 17/30359 |
| 2009/0119325 A1* | 5/2009 | Petri | G06F 17/30911 |
| 2010/0011027 A1* | 1/2010 | Cox | G06Q 10/06 707/E17.005 |
| 2010/0158477 A1* | 6/2010 | Kummer | H04N 5/76 386/291 |
| 2014/0155053 A1 | 6/2014 | Kaarela et al. | |
| 2016/0219075 A1* | 7/2016 | Bailloeul | H04L 63/20 |

* cited by examiner

*Primary Examiner* — Joseph D Manoskey
(74) *Attorney, Agent, or Firm* — Cantor Colburn LLP (57) ABSTRACT

Embodiments include method, systems and computer program products for prioritizing delivery of messages across multiple communication systems. Aspects include that a conflict resolution system is configured to identify a plurality of processes. The conflict resolution system is further configured to generate a plurality of conflict rules corresponding to the plurality of processes. Based on the at least one selected process, the conflict resolution system can identify a conflict corresponding to at least one selected process of the plurality of processes in a conflict medium. In the exemplary embodiment, the conflict resolution system, applies at least one selected conflict rule of the plurality of conflict rules corresponding to the conflict, the at least one selected process, and the conflict medium. Based on the at least one selected conflict rule, the conflict resolution system modifies the at least one selected process.

19 Claims, 5 Drawing Sheets

RESOLVING CONFLICTS BETWEEN MULTIPLE SOFTWARE AND HARDWARE PROCESSES

BACKGROUND

The present disclosure relates to resolving conflicts between processes, and more specifically to methods, systems, and computer program products for resolving conflicts between multiple processes across common mediums.

In today's society, individuals often utilize a variety of hardware processes and software processes during daily activities, such as watching television, using hand held devices, using data center systems, operating air conditioners, etc. In addition, individuals may have concurrent processes that each requires a user's attention. This proliferation of concurrent processes makes conflicts possible wherein conflicting processes are incompatible or may otherwise cause an undesirable result.

Users may have their own preferences with respect to how they wish to address processes that are in conflict. Certain devices or programs may utilize localized logic to handle conflicts.

However, localized conflict resolution may not be able to consider user preferences or parameters, such as location, time, and other contextual parameters. This can lead to undesirable conflict resolution as well as downtime and revenue loss.

SUMMARY

In accordance with an embodiment, a method for resolving conflicts between multiple processes is provided. The method includes identifying a plurality of processes. The method further includes generating a plurality of conflict rules corresponding to the plurality of processes. Based on the at least one selected process, the method can further include identifying a conflict corresponding to at least one selected process of the plurality of processes in a conflict medium. In the exemplary embodiment, the method includes applying at least one selected conflict rule of the plurality of conflict rules corresponding to the conflict, the at least one selected process, and the conflict medium. Based on the at least one selected conflict rule, the method includes modifying the at least one selected process.

In accordance with another embodiment, a conflict resolution system is configured to identify a plurality of processes. The conflict resolution system is further configured to generate a plurality of conflict rules corresponding to the plurality of processes. Based on the at least one selected process, the conflict resolution system can identify a conflict corresponding to at least one selected process of the plurality of processes in a conflict medium. In the exemplary embodiment, the conflict resolution system, applies at least one selected conflict rule of the plurality of conflict rules corresponding to the conflict, the at least one selected process, and the conflict medium. Based on the at least one selected conflict rule, the conflict resolution system modifies the at least one selected process.

In accordance with a further embodiment, a computer program product for resolving conflicts between multiple processes includes a non-transitory storage medium readable by a processing circuit and storing instructions for execution by the processing circuit for performing a method. The method includes identifying a plurality of processes. The method further includes generating a plurality of conflict rules corresponding to the plurality of processes. Based on the at least one selected process, the method can further include identifying a conflict corresponding to at least one selected process of the plurality of processes in a conflict medium. In the exemplary embodiment, the method includes applying at least one selected conflict rule of the plurality of conflict rules corresponding to the conflict, the at least one selected process, and the conflict medium. Based on the at least one selected conflict rule, the method includes modifying the at least one selected process.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
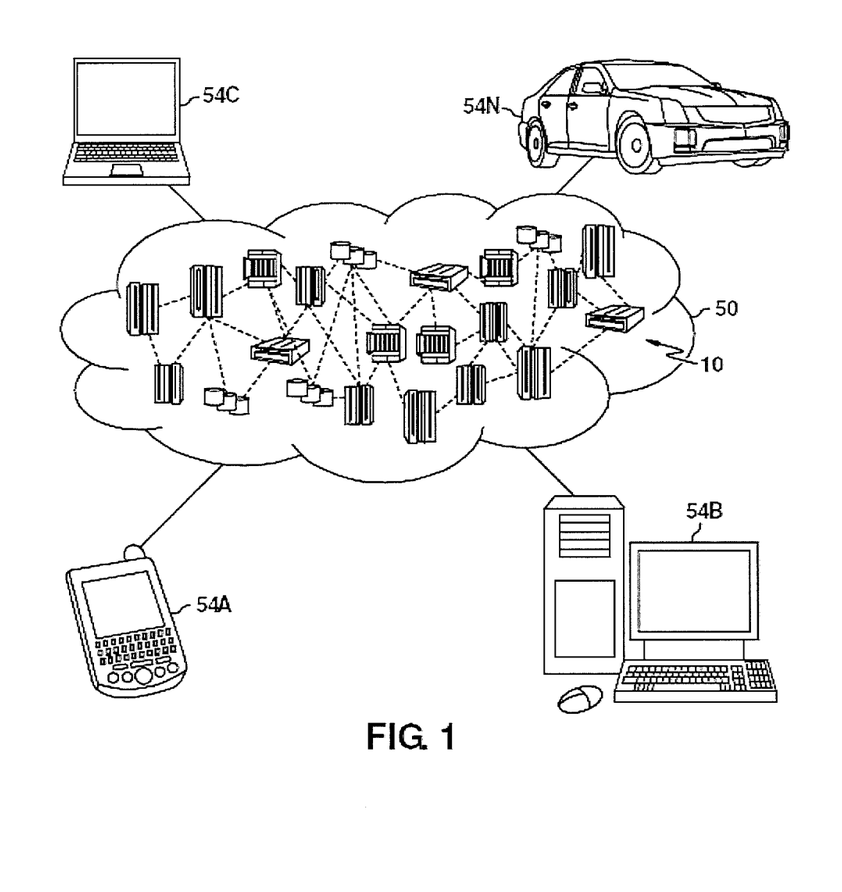
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
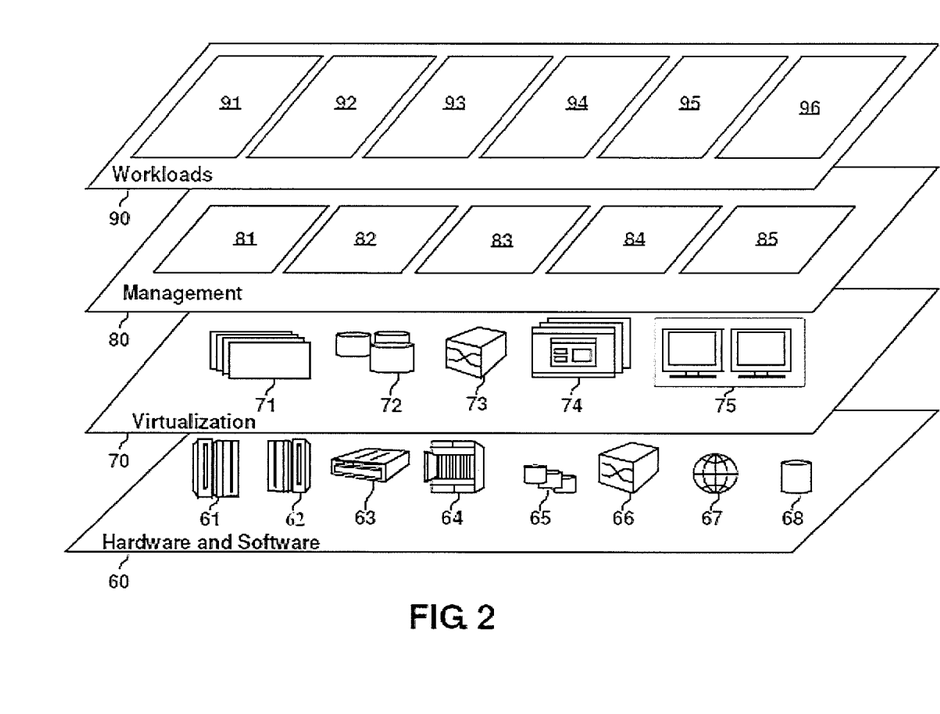
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resolving conflicts between multiple processes 96.

In accordance with exemplary embodiments of the disclosure, methods, systems and computer program products for resolving conflicts between multiple processes is provided. In exemplary embodiments, a conflict resolution system is configured to identify a plurality of processes. The conflict resolution system is further configured to generate a plurality of conflict rules corresponding to the plurality of processes. Based on the at least one selected process, the conflict resolution system can identify a conflict corresponding to at least one selected process of the plurality of processes in a conflict medium. In the exemplary embodiment, the conflict resolution system, applies at least one selected conflict rule of the plurality of conflict rules corresponding to the conflict, the at least one selected process, and the conflict medium. Based on the at least one selected conflict rule, the conflict resolution system modifies the at least one selected process.

Figure 3:
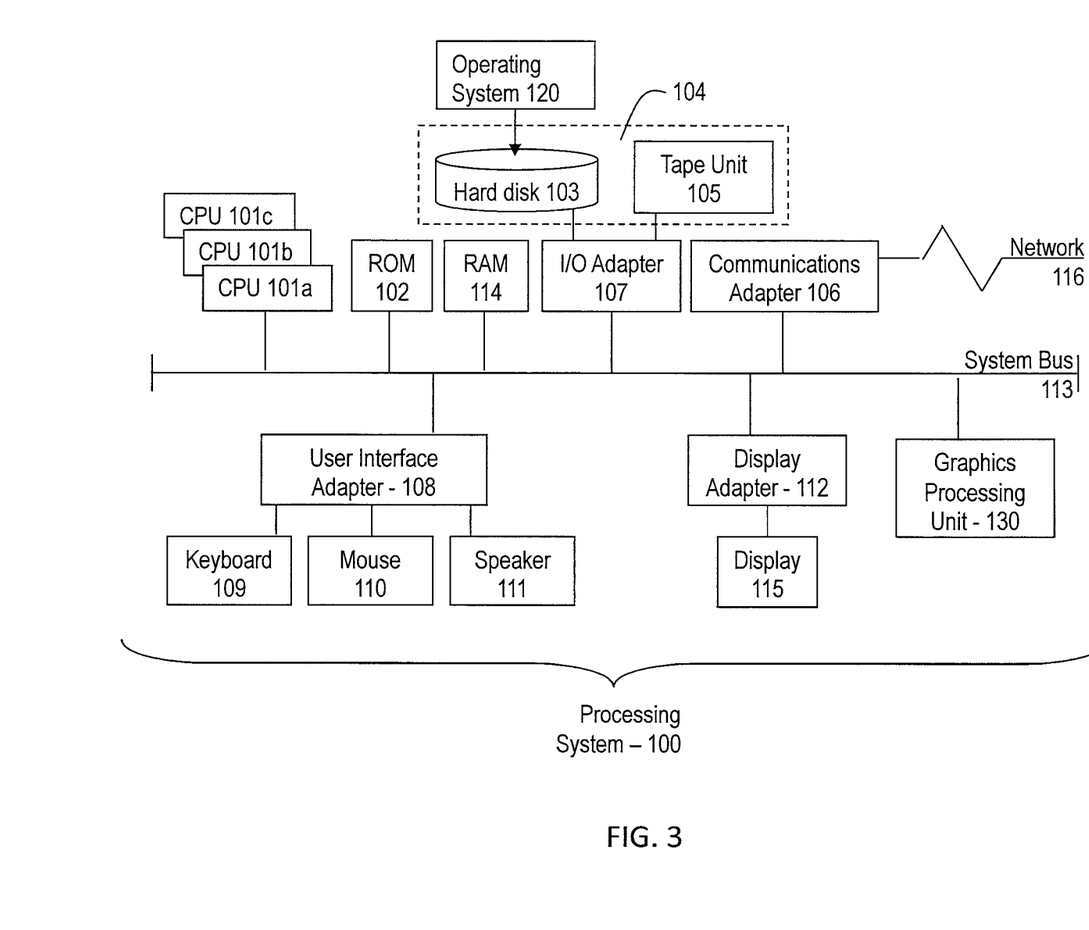
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
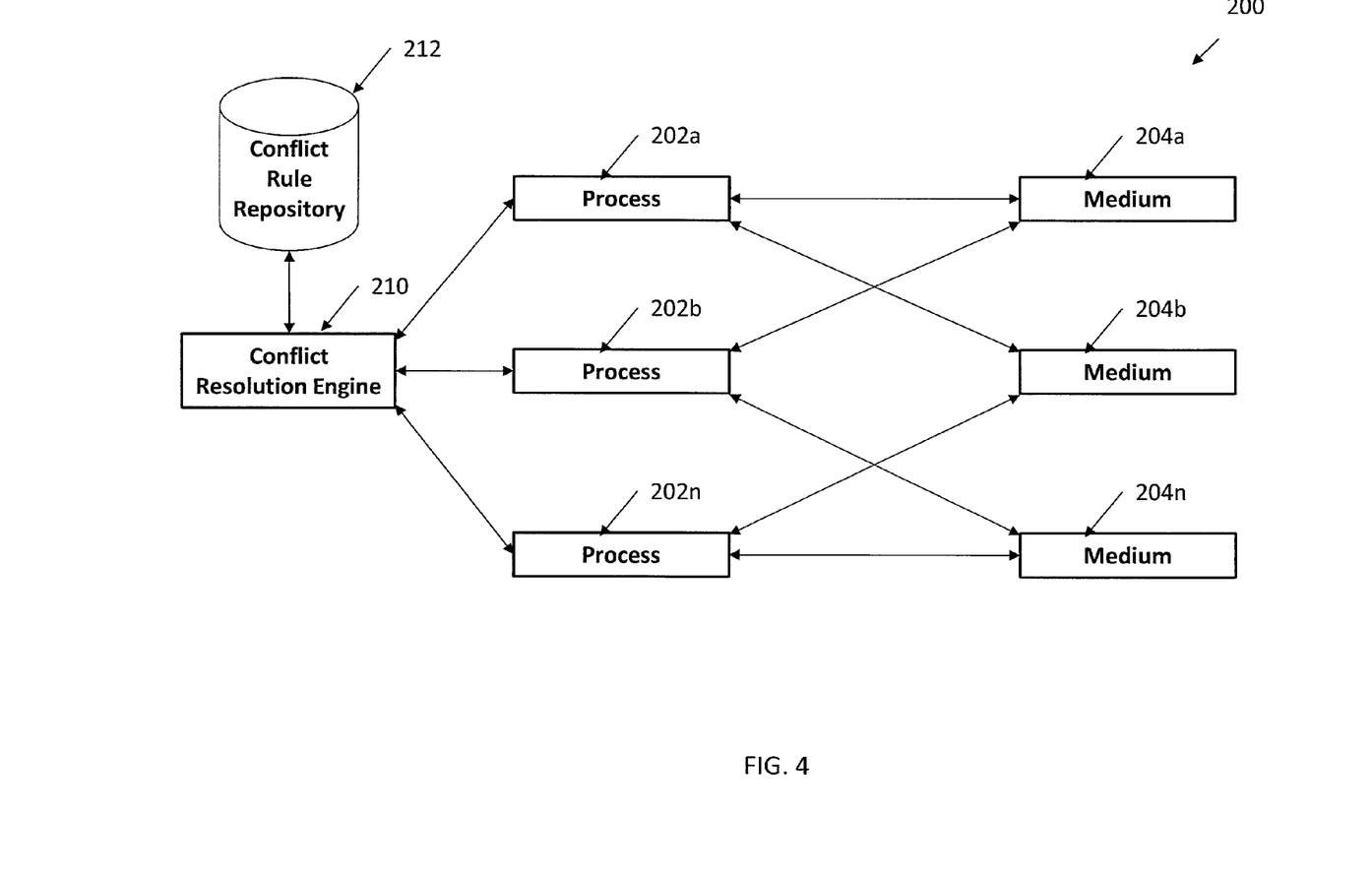
FIG. 4 is a block diagram illustrating a conflict resolution system in accordance with an exemplary embodiment.

Referring now to FIG. 4, a system 200 for resolving conflicts between multiple processes is shown. As illustrated, the system 200 includes processes 202a-202n that operate utilizing mediums 204a-204n. Processes 202a-202n may be incompatible or otherwise be in conflict with other processes 202a-202n that operate utilizing a same or similar medium 204a-204n. As further illustrated, the processes 202a-202n are in communication with a conflict resolution engine 210.

In an exemplary embodiment, the system 200 includes a plurality of processes 202a-202n. In exemplary embodiments, the processes 202a-202n can be any suitable process that a user may interact with or that may be executed on behalf of a user. In exemplary embodiments, processes 202a-202n include software processes and hardware devices. Processes 202a-202n can include and correspond to processes performed by hardware devices such as televisions, cellular phones, air conditioners, etc. Further, processes 202a-202n can include processes performed by consumer software such as online banking software, screen sharing software, etc. Additionally, processes 202a-202n can include processes performed by business software such as database management software, reporting software, etc.

In an exemplary embodiment, the processes 202a-202n can utilize mediums 204a-204n to transmit information to a user, receive information from a user, or to interact with or otherwise affect other processes 202a-202n. In an exemplary embodiment, mediums 204a-204n include sensory mediums such as audio mediums, visual mediums, tactile mediums, etc. or functional and/or conceptual mediums. For example, processes 202a-202n can utilize sensory mediums such as audio, visual, or tactile mediums to communicate information or receive information from a user. In certain embodiments, multiple processes 202a-202n can utilize the same sensory medium 204a-204n which may cause a conflict or otherwise prevent the desired communication or transmission of information. Additionally, processes 202a-202n can utilize conceptual or functional mediums to modify information on the behalf of a user. In certain embodiments, multiple processes 202a-202n can require access to the same information or require that certain functions or information be generated or performed before other functions that may cause a conflict in the same functional or conceptual medium 204a-204n.

In an exemplary embodiment, the processes 202a-202n can have conflicts in the mediums 204a-204n wherein multiple processes 202a-202n utilize the same medium 204a-204n in an incompatible manner as described above. The conflicts may occur in planes of conflict, including, but not limited a temporal plane, a functional plane, and a spatial plane. In an exemplary embodiment, conflicts may occur in a temporal plane wherein multiple processes 202a-202n utilize a medium 204a-204 at a same time in an incompatible manner. Further, conflicts may occur in a functional plane wherein multiple processes 202a-202n utilize a medium 204a-204n to perform a same, similar, or otherwise incompatible function with respect to another process 202a-202n. For example, a process 202a-202n may require another piece of information or for a process 202a-202n to occur or not to occur to be performed in a compatible manner or in a user desired order. Additionally, conflicts may occur in a spatial plane wherein multiple processes 202a-202n may require a same physical space or use of a physical space for operation.

In an exemplary embodiment, conflicts can occur at a device level, a process level, or a conceptual level. For example, conflicts may occur intra-device, wherein multiple processes 202a-202n within a single device may experience conflicts (e.g. receiving a phone call while watching a video on the phone). Conflicts may further occur at a process level, wherein multiple processes 202a-202n across multiple devices may experience conflicts, (e.g. receiving a phone call while watching television). Further, conflicts may occur at a conceptual level, wherein multiple processes 202a-202n across multiple devices and systems may experience conflicts (e.g. write protecting data before a sort).

In an exemplary embodiment, the conflict resolution engine 210 is in communication with the processes 202a-202n to prevent and manage conflicts within the mediums 204a-204n in accordance with user parameters. In an exemplary embodiment, the conflict resolution engine 210 includes a conflict rule repository 212 to store rules to resolve conflicts between multiple processes 202a-202n. In an exemplary embodiment, the conflict resolution engine 210 is a context specific policy engine that utilizes developed policies and rules to determine the interaction and conflict resolution of processes 202a-202n within the medium 204a-204n. The conflict resolution engine 210 can be a dedicated hardware device or a software engine to run on any suitable processor or platform.

In an exemplary embodiment, the conflict resolution engine 210 identifies the processes 202a-202n that are to be managed within the system 200. Identification can be performed over any suitable communication method including wired, wireless, and any other method. In certain embodiments, the conflict resolution engine 210 can be directly connected to the processes 202a-202n to identify the processes. In other embodiments, the conflict resolution engine 210 can be provided with a list or database corresponding with the relevant processes 202a-202n. In certain embodiments, the conflict resolution engine 210 can provide a broadcast or broad query to processes 202a-202n that can be interrogated via software or hardware.

In certain embodiments, the conflict resolution engine 210 can receive information regarding the current status and previous activity of the processes 202a-202n via activity logs. Advantageously, the conflict resolution engine 210 can review and analyze the activity logs of the outstanding processes 202a-202n to determine activity and which processes 202a-202n may cause conflicts or require user attention. The activity logs can further provide context to determine optimal conflict resolution. For example, the conflict resolution engine 210 can determine parameters such as the last activity, a current status, context specific details, such as current process 202a-202n usage and other context relevant details. In an exemplary embodiment, the conflict resolution engine 210 can determine the mediums 204a-204n processes 202a-202n can utilize, such as voice, audio, audio-visual, etc. In certain embodiments, an activity log can be forward looking and provide planned activities to allow the conflict resolution engine 210 proactively plan for conflicts. In an exemplary embodiment, the conflict resolution engine 210 can look at a user's planned events to determine temporal and planned events.

In an exemplary embodiment, the conflict resolution engine 210 can determine an entity-relation link that a process 202a-202 has with the user and the other processes 202a-202n. In an exemplary embodiment, the conflict resolution engine 210 can form a semantic model to represent each process 202a-202n and users thereof. The semantic model can explain the types of entities involved in communication involving processes 202a-202n. In certain embodiments the semantic model of each process 202a-202n and other entities can model controls that are available for manipulation to resolve conflicts.

For example, the conflict resolution engine 210 can characterize a user or person's associated devices to determine which devices the user has, such as a phone, tablet, e-reader, etc. Further the conflict resolution engine 210 can characterize who a user connects with to determine personal relationships. The conflict resolution engine 210 can further determine types of relationships, such as a family member, extended family member, business contact, etc. The conflict resolution engine can further identify if a connection is planned, or unplanned, the device used and the type of meeting.

In an exemplary embodiment, the conflict resolution engine 210 can further characterize each process 202a-202n to determine the functionality and interactions of each process 202a-202n. In certain embodiments, the intended function of each process 202a-202n can be modeled, for example to determine if a software process intends to randomize data to prevent a conflict with another software process that intends to store or analyze the same data. In certain embodiments, the conflict resolution engine 210 can determine a date, time and duration of processes 202a-202n to determine temporal type conflicts. In certain embodiments, the conflict resolution engine 210 can determine a communication medium 204a-204n of processes 202a-202n.

In an exemplary embodiment, the conflict rule engine 210 can generate conflict rules. In an exemplary embodiment, the generated conflict rules are stored in a conflict rule repository 212. In an exemplary embodiment, the conflict rule engine 210 can utilize the characterizations, temporal criteria, spatial criteria and user preferences to create rules and priorities with respect to processes 202a-202n. In an exemplary embodiment, conflict rules will determine the priority and response to a conflict within a medium. Conflict rules can provide a response that takes into account the conflicting processes 202a-202n, the conflict medium 204a-204n, and conflict parameters such as contextual parameters, user preferences, location, and time. For example, location criteria can be utilized to determine if a user is on vacation and alter parameters to dynamically adjust conflict resolution rules. Similarly, temporal criteria can create different responses based on time of day to alter conflict resolution rules. In certain embodiments, previously generated rules can be reviewed and analyzed to determine effectiveness and to aid in creating more relevant conflict resolution rules.

In an exemplary embodiment, the conflict resolution engine 210 can determine if a conflict exists. In an exemplary embodiment, various conflict mediums 204a-204n or planes of conflict can be analyzed to determine if a conflict exists between processes 202a-202n. In an exemplary embodiment, the conflict resolution engine 210 can identify the processes 202a-202n involved, the medium 204a-204n involved in the conflict, and the characterization of the user and the processes 202a-202n to determine a conflict resolution policy to apply. In an exemplary embodiment, the conflict resolution engine 210 can utilize conflict parameters such as user parameters and contextual parameters, along with identifying the conflicting processes 202a-202n and conflict medium 204a-204a to determine an optimal or desired conflict resolution rule for a given conflict. In certain embodiments, multiple conflict rules may be available for a given conflict, wherein the rule selected is contingent on conflict parameters.

In an exemplary embodiment, after a conflict is determined, the conflict resolution engine 210 can either provide a user alert to resolve a conflict. In an exemplary embodiment, for each identified conflict, the conflict resolution engine 210 can provide a pre-defined set of recommendations. For example, a notification can be sent to user along with a visual notification displayed on an appropriate user device. For certain conflicts, such as a conflict between a television and a phone, a mute of the television can be recommended. In other embodiments, such as a conflict between a personal chat window and a business chat window an automatic message or appropriate status change is recommended.

In other embodiments, parameters of the processes 202a-202n can be adjusted by the conflict resolution engine 210 to resolve conflicts. In certain embodiments, the superseded process 202a-202n can be altered in response to a conflict. In other embodiments, both or multiple processes 202a-202n can be altered in response to a conflict. Parameters can include device specific functions such as accepting calls, rejecting calls, silent/vibrate, airplane mode, television source adjustment, television power toggle, application switching controls, incoming notification controls, etc.

Examples of use of the conflict resolution system 200 are described herein. For example, a smartphone may be identified by the conflict resolution engine. In an exemplary embodiment, an ongoing smart phone call can be identified as a process 202a which is superseded by a planned meeting notification process 202b from a calendar. The conflict resolution engine 210 may characterize the ongoing phone call and the planned meeting notification to determine a desired resolution. In certain embodiments, the conflict resolution engine 210 can determine if the current call phone number matches the phone number to be called for the planned meeting notification. In another embodiment, the conflict resolution engine 210 may handle inter-device conflicts, such as when a television is switched on, occupying a common medium (audio) as ongoing phone call.

In another embodiment, the conflict resolution engine 210 can characterize an online banking transaction process 202a as a sensitive process. The conflict resolution engine 210 can further characterize a screen sharing process 202b to utilize the same medium 204a as the banking transaction process 202a. The conflict resolution engine 210 can identify that the banking process 202a and the screen sharing process 202b are not compatible within the same medium 204a. In certain embodiment, the conflict resolution engine 210 can provide a notification or automatically end the screen sharing process 202b.

In certain embodiments, the conflict resolution engine 210 can further manage software processes. In certain embodiments, a database audit process 202a may require referential integrity of data, while certain regulations may require data to be private without maintaining the business enforced referential integrity. Therefore, an anonymizing process 202b may functionally operate in the same medium 204a as the database audit process 202a. The conflict resolution engine 210 can characterize and recognize this conflict and either alert a user or order the audit process 202a and the anonymizing process 202b to allow both processes to proceed as desired.

Figure 5:
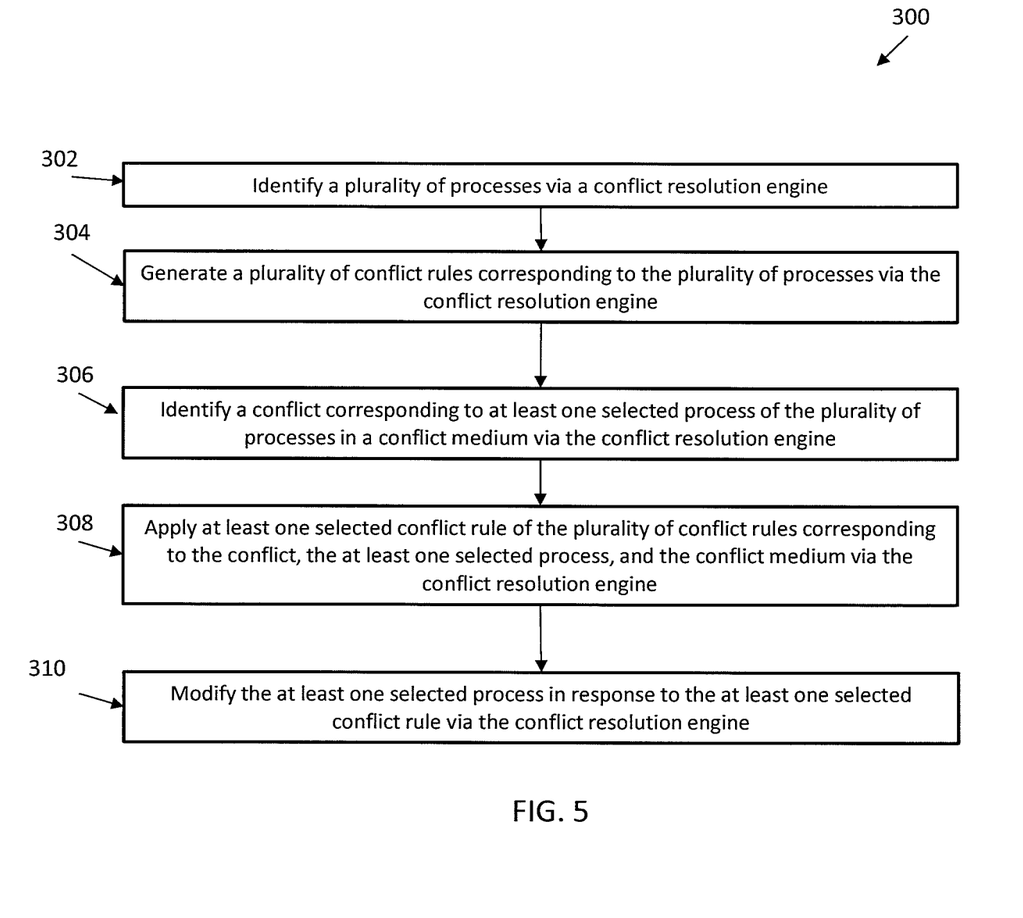
FIG. 5 is a flow diagram of a method for resolving conflicts between multiple processes in accordance with an exemplary embodiment.

Referring to FIG. 5, a method 300 for resolving conflicts between multiple processes is shown. In operation 302, a plurality of processes are identified via a conflict resolution engine. In certain embodiments, activity logs and statuses of the processes are obtained to characterize the processes. In certain embodiments, the conflict resolution engine can receive information regarding the current status and previous activity of the processes via activity logs. Advantageously, the conflict resolution engine can review and analyze the activity logs of the outstanding processes to determine activity and which processes may cause conflicts or require user attention. The activity logs can further provide context to determine optimal conflict resolution.

In operation 304, a plurality of conflict rules are generated corresponding to the plurality of processes via the conflict resolution engine. In an exemplary embodiment, the conflict rule engine can utilize the characterizations, temporal criteria, spatial criteria and user preferences to create rules and priorities with respect to processes.

In operation 306, a conflict corresponding to at least one selected process of the plurality of processes in a conflict medium is identified via the conflict resolution engine. In an exemplary embodiment, various conflict mediums or planes of conflict can be analyzed to determine if a conflict exists between processes.

In operation 308, at least one selected conflict rule of the plurality of conflict rules corresponding to the conflict, the at least one selected process, and the conflict medium is applied via the conflict resolution engine. In an exemplary embodiment, the conflict resolution engine can identify the processes involved, the medium involved in the conflict, and the characterization of the user and the processes to determine a conflict resolution policy to apply.

In operation 310, the at least one selected process is modified in response to the at least one selected conflict rule via the conflict resolution engine. In certain embodiments, the conflict resolution engine can modify parameters after prompting the user. In other embodiments, the conflict resolution engine can modify parameters automatically. In an exemplary embodiment, for each identified conflict, the conflict resolution engine can provide a pre-defined set of recommendations. For example, a notification can be sent to user along with a visual notification displayed on an appropriate user device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for resolving conflicts between multiple processes, the computer implemented method comprises:

identifying a plurality of processes via a conflict resolution engine, wherein the plurality of processes are configured to utilize one or more sensory mediums to communicate information to and from one or more users, wherein the one or more sensory mediums each include at least one of a visual medium, an audio medium, or a tactile medium;

generating, via the conflict resolution engine, a semantic model that represents each process of the plurality of processes and the one or more users based on a plurality of entity-relation links;

generating, based at least in part on the generated semantic model, a plurality of conflict rules corresponding to the plurality of processes via the conflict resolution engine;

identifying, via the conflict resolution engine, a conflict corresponding to at least one selected process of the plurality of processes in a sensory medium of the one or more sensory mediums;

applying at least one selected conflict rule of the plurality of conflict rules corresponding to the conflict, the at least one selected process, and the sensory medium via the conflict resolution engine; and modifying the at least one selected process in response to the at least one selected conflict rule via the conflict resolution engine.

2. The computer implemented method of claim 1, wherein identifying the plurality of processes further includes identifying a plurality of statuses corresponding to the plurality of processes via the conflict resolution engine.

3. The computer implemented method of claim 1, wherein generating the plurality of conflict rules further includes analyzing a plurality of activity logs corresponding to the plurality of processes via the conflict resolution engine.

4. The computer implemented method of claim 1, wherein applying at least one selected conflict rule further includes identifying a superseding process of the at least one selected process corresponding to the at least one selected conflict rule via the conflict resolution engine.

5. The computer implemented method of claim 1, wherein the plurality of conflict rules correspond to a plurality of conflict parameters via the conflict resolution engine.

6. The computer implemented method of claim 5, wherein the plurality of conflict parameters includes a user preference parameter, a location parameter, and a time parameter.

7. The computer implemented method of claim 1, wherein the plurality of processes include at least one of a hardware process and a software process.

8. A computer program product for resolving conflicts between multiple processes, the computer program product comprising:
a non-transitory storage medium readable by a processing circuit and storing instructions for execution by the processing circuit for performing a method comprising:
identifying a plurality of processes, wherein the plurality of processes are configured to utilize one or more sensory mediums to communicate information to and from one or more users, wherein the one or more sensory mediums each include at least one of a visual medium, an audio medium, or a tactile medium;
generating a semantic model that represents each process of the plurality of processes and the one or more users based on a plurality of entity-relation links;
generating, based at least in part on the generated semantic model, a plurality of conflict rules corresponding to the plurality of processes;
identifying a conflict corresponding to at least one selected process of the plurality of processes in a sensory medium of the one or more sensory mediums;
applying at least one selected conflict rule of the plurality of conflict rules corresponding to the conflict, the at least one selected process, and the sensory medium; and
modifying the at least one selected process in response to the at least one selected conflict rule.

9. The computer program product of claim 8, wherein identifying the plurality of processes further includes identifying a plurality of statuses corresponding to the plurality of processes.

10. The computer program product of claim 8, wherein generating the plurality of conflict rules further includes analyzing a plurality of activity logs corresponding to the plurality of processes.

11. The computer program product of claim 8, wherein applying at least one selected conflict rule further includes identifying a superseding process of the at least one selected process corresponding to the at least one selected conflict rule.

12. The computer program product of claim 8, wherein the plurality of conflict rules correspond to a plurality of conflict parameters.

13. The computer program product of claim 12, wherein the plurality of conflict parameters includes a user preference parameter, a location parameter, and a time parameter.

14. A conflict resolution system for resolving conflicts between multiple processes, comprising:
a processor in communication with one or more types of memory, the processor configured to:
identify a plurality of processes, wherein the plurality of processes are configured to utilize one or more sensory mediums to communicate information to and from one or more users, wherein the one or more sensory mediums each include at least one of a visual medium, an audio medium, or a tactile medium;
generate a semantic model that represents each process of the plurality of processes and the one or more users based on a plurality of entity-relation links;
generate, based at least in part on the generated semantic model, a plurality of conflict rules corresponding to the plurality of processes;
identify a conflict corresponding to at least one selected process of the plurality of processes in a sensory medium of the one or more sensory mediums;
apply at least one selected conflict rule of the plurality of conflict rules corresponding to the conflict, the at least one selected process, and the sensory medium; and
modify the at least one selected process in response to the at least one selected conflict rule.

15. The conflict resolution system of claim 14, wherein the processor is further configured to identify a plurality of statuses corresponding to the plurality of processes.

16. The conflict resolution system of claim 14, wherein the processor is further configured to analyze a plurality of activity logs corresponding to the plurality of processes.

17. The conflict resolution system of claim 14, wherein the processor is further configured to identify a superseding process of the at least one selected process corresponding to the at least one selected conflict rule.

18. The conflict resolution system of claim 14, wherein the processor is further configured to generate the plurality of conflict rules corresponding to a plurality of conflict parameters.

19. The conflict resolution system of claim 18, wherein the plurality of conflict parameters includes a user preference parameter, a location parameter, and a time parameter.

* * * * *